United States Patent
Hoshiyama

(10) Patent No.: US 12,350,825 B2
(45) Date of Patent: Jul. 8, 2025

(54) TEACHING DEVICE, TEACHING SYSTEM, AND TEACHING PROGRAM

(71) Applicant: FANUC CORPORATION, Yamanashi (JP)

(72) Inventor: Teppei Hoshiyama, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 215 days.

(21) Appl. No.: 18/003,155

(22) PCT Filed: Jul. 26, 2021

(86) PCT No.: PCT/JP2021/027569
§ 371 (c)(1),
(2) Date: Dec. 23, 2022

(87) PCT Pub. No.: WO2022/025001
PCT Pub. Date: Feb. 3, 2022

(65) Prior Publication Data
US 2023/0234218 A1    Jul. 27, 2023

(30) Foreign Application Priority Data
Jul. 28, 2020 (JP) .................. 2020-127302

(51) Int. Cl.
*B25J 9/00* (2006.01)
*B25J 9/16* (2006.01)

(52) U.S. Cl.
CPC ........... *B25J 9/0081* (2013.01); *B25J 9/1656* (2013.01)

(58) Field of Classification Search
CPC ...... B25J 9/0081; B25J 9/1656; B25J 9/1664; B25J 9/22; G05B 2219/40113; G05B 19/42
See application file for complete search history.

(56) References Cited

U.S. PATENT DOCUMENTS

| | | | |
|---|---|---|---|
| 2011/0106304 A1* | 5/2011 | Nihei | B25J 9/1664 901/3 |
| 2013/0079928 A1 | 3/2013 | Soe-Knudsen et al. | |
| 2015/0290795 A1* | 10/2015 | Oleynik | B25J 9/0081 700/257 |

(Continued)

FOREIGN PATENT DOCUMENTS

| | | |
|---|---|---|
| CN | 101683037 A | 3/2010 |
| CN | 109834695 A | 6/2019 |

(Continued)

*Primary Examiner* — Jonathan L Sample
*Assistant Examiner* — Alan Lindsay Ostrow
(74) *Attorney, Agent, or Firm* — HAUPTMAN HAM, LLP

(57) ABSTRACT

This teaching device comprises: a user interface unit capable of displaying a creation screen for a robot program; a teaching point display control unit for controlling displaying of previously taught teaching points on the creation screen; a teaching point selection unit for selecting a specific teaching point from the displayed teaching points; and a teaching point reuse unit for reusing the selected teaching point as a new teaching point for a robot program being created. The previously taught teaching points include at least one of a teaching point taught previously for the robot program being created and a teaching point taught previously for another robot program different from the robot program.

9 Claims, 7 Drawing Sheets

(56) References Cited

U.S. PATENT DOCUMENTS

| | | | | |
|---|---|---|---|---|
| 2016/0176055 A1* | 6/2016 | McGlinchy | ........ | G05B 19/4083 901/41 |
| 2019/0160662 A1 | 5/2019 | Satou | | |
| 2019/0240833 A1* | 8/2019 | Kimura | ................. | B25J 9/1664 |
| 2019/0389059 A1* | 12/2019 | Shibata | ................. | B25J 9/1656 |
| 2021/0023711 A1* | 1/2021 | Lee | ......................... | B25J 9/163 |

FOREIGN PATENT DOCUMENTS

| | | |
|---|---|---|
| JP | H6-270082 A | 9/1994 |
| JP | H19-85655 A | 3/1997 |
| JP | 2006-331188 A | 12/2006 |
| JP | 2019-89201 A | 6/2019 |
| WO | 2018110601 A1 | 6/2018 |

\* cited by examiner

TEACHING DEVICE, TEACHING SYSTEM, AND TEACHING PROGRAM

RELATED APPLICATIONS

The present application is a National Phase of International Application No. PCT/JP2021/027569 filed Jul. 26, 2021, which claims priority to Japanese Application No. 2020-127302, filed Jul. 28, 2020.

TECHNICAL FIELD

The present invention relates to a teaching technique for a robot, and in particular, to a teaching device having a function to reuse a teaching point, a teaching system and a teaching program.

BACKGROUND ART

Generally, teaching of the robot or confirmation of the state is performed from a teaching operation panel with a display device. For example, in a robot configured to perform handling, a robot program is generated by teaching a target position of the robot called a teaching point, followed by teaching opening/closing of a hand, and handling is achieved by executing the generated robot program.

When a position close to or the same as an already taught teaching point is taught as a new teaching point, it is necessary to conduct a search in order to determine which robot program has taught the already taught teaching point, whereby the efficiency of the teaching operation is impaired. Also, in case where there are a plurality of taught points at the same taught position, and each taught point is taught as a different one, when the taught position of any one of these taught points is corrected, the other teaching points which were originally the same position also need to be corrected. However, a problem may arise if the robot is operated without correcting the other teaching points. Robot programming techniques related to teaching points are well known, for example, from the following documents.

Patent Literature 1 discloses a teaching operation panel for a robot, wherein a touch panel is provided on a display screen of a graphic display device, and by touching an arbitrary place on the screen with a fingertip, positional information on the screen representing that place is input to the teaching operation panel, and a teaching point is graphically displayed three-dimensionally on the display screen. If necessary, the current position of the robot can be displayed at the same time, the teaching point can be designated by touching it with a finger, and the designated teaching point can be moved within a predetermined plane.

Patent Literature 2 discloses a method for controlling a robot having an auxiliary axis, the robot comprising: a means for calculating a distance from the current positions of a robot hand and the auxiliary axis to a plurality of already taught teaching points; a means for selecting a teaching point with the closest distance from the plurality of calculated teaching points; and a means for moving to different teaching points when the teaching points selected for the robot and the auxiliary axis are different.

Patent Literature 3 discloses a teaching point correction device, comprising: a determination unit configured to determine whether or not position data of any one of a plurality of different teaching points included in a work program which have been taught in advance; and a data correction unit configured to, when the determination unit determines that the position data of a first teaching point of the plurality of different teaching points has been corrected, correct position data of a relevant teaching point having a relative positional relationship with respect to the first teaching point, according to a teaching point rule prescribing the relative positional relationship of the plurality of different teaching points.

CITATION LIST

Patent Literature

[PTL 1] JP 1997(H09)-85655 A
[PTL 2] JP 1994(H06)-270082 A
[PTL 3] JP 2006-331188 A

SUMMARY OF INVENTION

Technical Problem

The object of the present invention is to improve the efficiency of a teaching operation for a robot in view of the above problems associated with the prior art.

Solution to Problem

One aspect of the present disclosure provides a teaching device comprising: a user interface unit configured to display a generation screen for a robot program; a teaching point display control unit configured to control displaying of previously taught teaching points on the generation screen; a teaching point selection unit configured to select a specific teaching point from the displayed teaching points; and a teaching point reuse unit configured to reuse the selected teaching point as a new teaching point for a robot program being generated, wherein the previously taught teaching point includes at least one of a teaching point previously taught for the robot program being generated and a teaching point previously taught for another robot program different from the robot program.

Another aspect of the present disclosure provides a teaching system comprising: a teaching device configured to display a generation screen for a robot program; and a robot controller configured to: control displaying of previously taught teaching points on the generation screen; select a specific teaching point from the displayed teaching points; and reuse the selected teaching point as a new teaching point for a robot program being generated, wherein the previously taught teaching point includes at least one of a teaching point previously taught for the robot program being generated and a teaching point previously taught for another robot program different from the robot program.

A further aspect of the present disclosure provides a teaching program causing a computer to execute the steps of: controlling displaying of previously taught teaching points on the generation screen; selecting a specific teaching point from the displayed teaching points; and reusing the selected teaching point as a new teaching point for a robot program being generated, wherein the previously taught teaching point includes at least one of a teaching point previously taught for the robot program being generated and a teaching point previously taught for another robot program different from the robot program.

Advantageous Effects of Invention

According to the one aspect of the present disclosure, in addition to the teaching points previously taught in the robot program being generated, the teaching points previously taught in another robot program different from the former robot program can be used as new teaching points, whereby the efficiency of the teaching operation for the robot can be improved.

DESCRIPTION OF EMBODIMENTS

Figure 1:
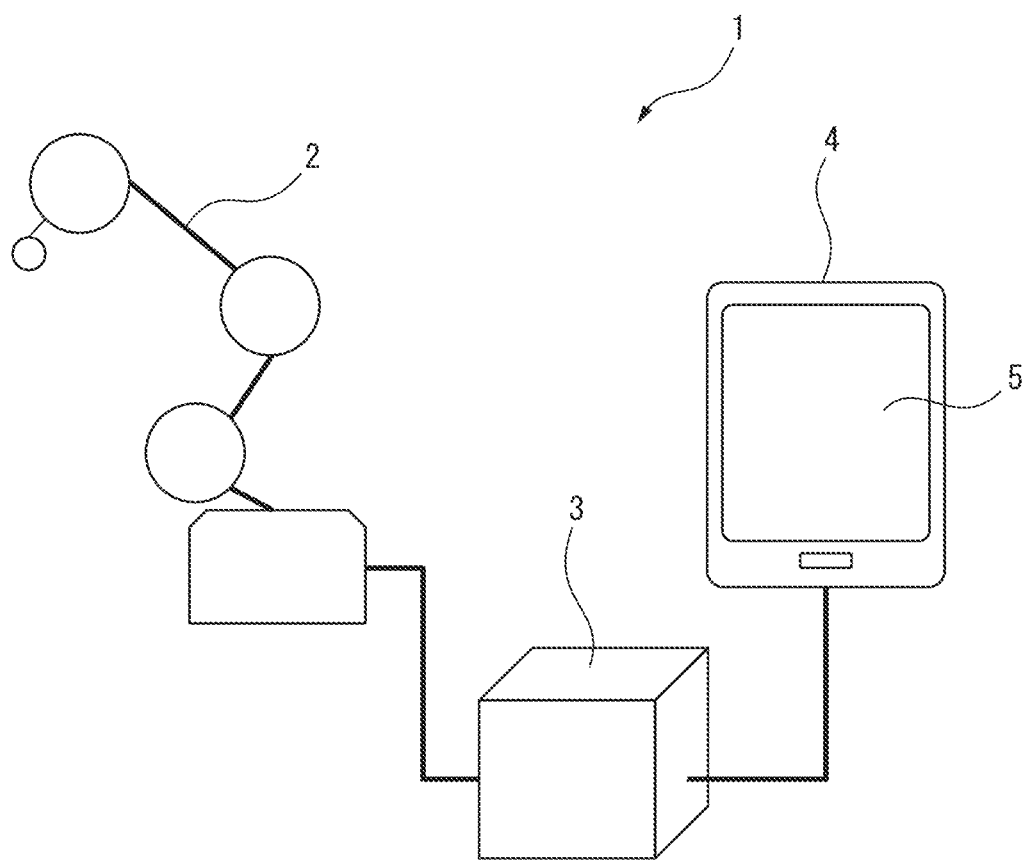
FIG. 1 is a schematic view of a robot system of an embodiment.

The embodiments of the present disclosure will be described in detail below with reference to the attached drawings. In the drawings, identical or similar constituent elements have been assigned the same or similar reference signs. Furthermore, the embodiments described below do not limit the technical scope of the invention described in the claims or the definitions of the terms.

FIG. 1 is a schematic view of a robot system 1 of an embodiment. The robot system 1 includes a robot 2, a robot controller 3 capable of controlling the robot 2, and a teaching device 4 capable of generating a robot program executed by the robot controller 3. For example, the robot 2 is a multi-joint robot, but may be another type such as a parallel link robot or a humanoid, etc. For example, the robot controller 3 is a computing device having a processor and/or an integrated circuit such as a CPU (central processing unit), an ASIC (application specific integrated circuit), and an FPGA (field-programmable gate array). For example, the teaching device 4 is a portable terminal such as a tablet, having a CPU and/or an integrated circuit, but may be a teaching operation panel of the robot controller 3. At the least, the teaching device 4 has a user interface unit 5 (hereinafter, referred to as merely "UI unit") capable of displaying a generation screen for a robot program. The UI unit 5 may be a device which at least has a display function for displaying various information and an input function for inputting the various information. For example, the UI unit 5 may be a touch panel device having a touch panel arranged on a display screen of a display unit. The robot 2, the robot controller 3 and the teaching device 4 are communicably connected to each other via wires or wirelessly.

Figure 2:
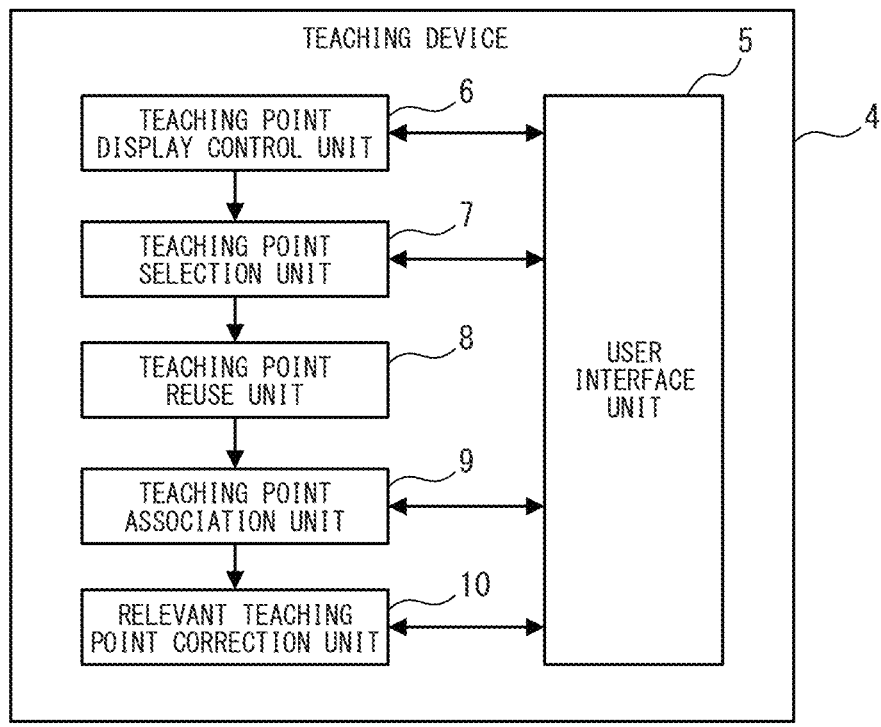
FIG. 2 is a block diagram of a teaching device of an embodiment.

FIG. 2 is a block diagram of the teaching device 4 of the embodiment. The teaching device 4 has: a teaching point display control unit 6 configured to control displaying of previously taught teaching points on the generation screen of the robot program being generated; a teaching point selection unit 7 configured to select a specific teaching point from the displayed teaching points; and a teaching point reuse unit 8 configured to reuse the selected teaching point as a new teaching point for a robot program being generated. In this regard, the "teaching point" herein means a passing point of a motion path of the robot 2. For example, in a handling robot, the teaching point is a tool center point (TCP), i.e., a gripping center point of a hand. Alternatively, the "teaching point" may be a tip point of the robot 2, i.e., a center point of a flange on which a tool such as the hand is attached.

Also, the teaching device 4 may have a teaching point association unit 9 configured to associate the previously taught teaching point with the new teaching point. Further, the teaching device 4 may have a relevant teaching point correction unit 10 configured to, when a teaching position of the teaching point is corrected, reflects the correction also on a teaching position of a remaining teaching point associated with the teaching point. At least one of these components referred to as " . . . unit" (the teaching point display control unit 6, the teaching point selection unit 7, the teaching point reuse unit 8, the teaching point association unit 9, and the related teaching point correction unit 10) may be implemented as a processor such as a CPU, an ASIC, an FPGA and/or an integrated circuit, etc., or may be implemented as a teaching program executable by a processor.

Figure 3:
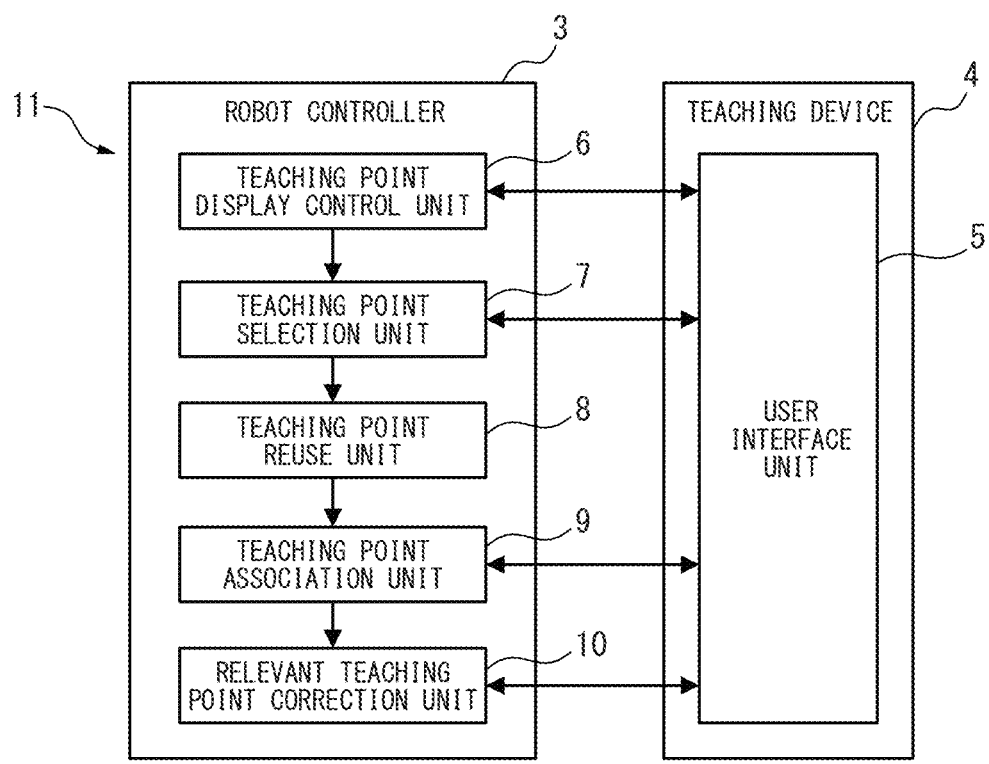
FIG. 3 is a block diagram of a modification of the teaching device.

The above configuration of the teaching device 4 is an example, and another configuration may be adopted or another component may be added to the configuration. For example, FIG. 3 is a block diagram showing a modification of the teaching device 4. The teaching device 4 may be a teaching operation panel attached to the robot controller 3. In this case, the teaching device 4 has only the UI section 5 capable of displaying the generation screen of the robot program. At least one of these components (the teaching point display control unit 6, the teaching point selection unit 7, the teaching point reuse unit 8, the teaching point association unit 9, and the related teaching point correction unit 10) are implemented on a side of the robot controller 3. A teaching system 11 configured by the robot controller 3 and the teaching device 4 may be formed as a centralized system such as a host computer, or may be formed as a distributed system such as cloud computing.

Figure 4:
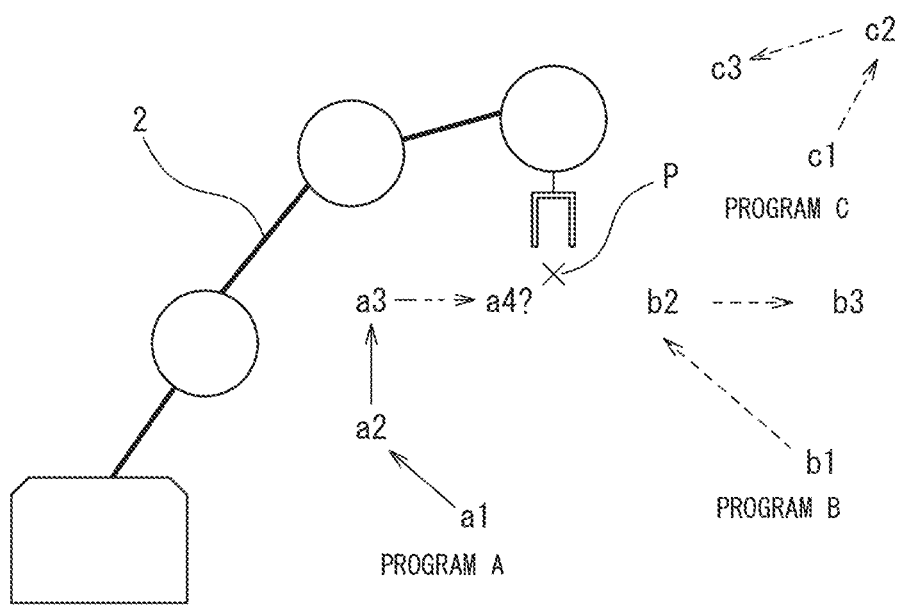
FIG. 4 is a graphic diagram of a teaching point display screen of an embodiment.

Hereinafter, details of operations of the teaching device 4 and the teaching system 11 will be discussed. FIG. 4 is a graphic diagram of a teaching point display screen of an embodiment. For example, it is assumed that a robot program A for causing the robot 2 to perform handling is being generated. Teaching points a1 to a3, b1 to b3, and c1 to c3 are teaching points previously taught by in robot programs A, B and C. In this example, although the teaching points of robot programs A, B and C are displayed, only the teaching points of the robot program A being created may be displayed, or, the teaching points of the robot programs B and C may be displayed, or, teaching points of another robot program (not shown) may be displayed. For example, when the robot program A is executed, the robot 2 moves from teaching points a1 to a3, i.e., from teaching points with smaller numbers to larger numbers. The same applies to other programs B and C. A point P is the current position of the robot 2. In addition, the "current position of the robot" herein means the tool center point (TCP), e.g., the gripping center point of the hand. Alternatively, the current position of the robot may be the tip point of the robot 2, e.g., the center point of the flange on which the tool is attached.

In such a situation, it is assumed that a next teaching point a4 from one teaching point a3 of the robot program A is added. For example, in case that a workpiece located at the teaching point b2 of the robot program B is to be collected at the teaching point a4 of the robot program A, when the teaching point a4 can be taught at the same position as the teaching point b2 previously taught in the robot program B, the efficiency of the teaching operation can be improved. Therefore, the teaching position of the teaching point b2 can be easily reused by following the process below.

Figure 5:
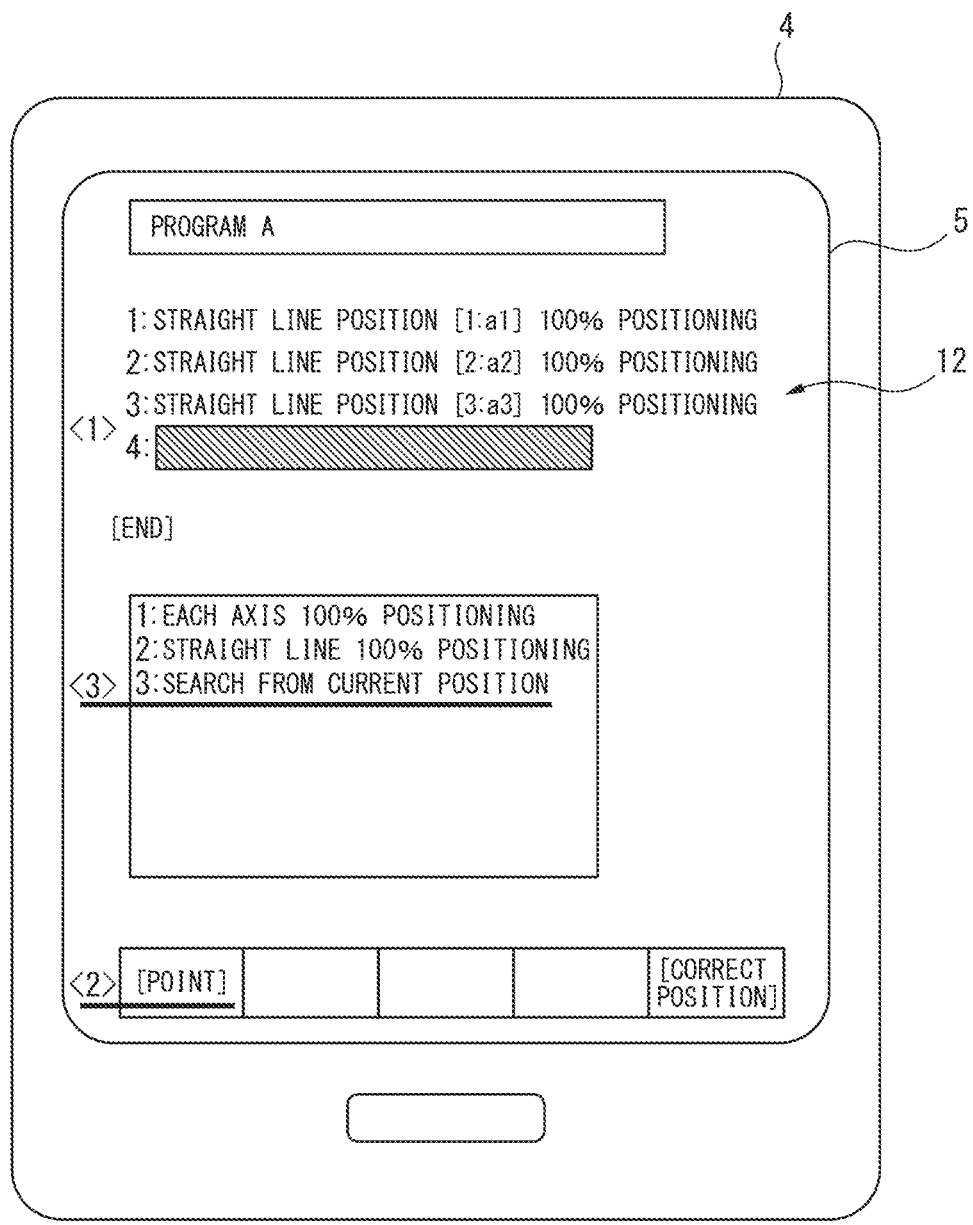
FIG. 5 is a graphic diagram of a robot program generation screen of an embodiment.

FIG. 5 is a graphic diagram of a robot program generation screen (hereinafter, referred to as merely "generation screen") 12 of an embodiment. When the teaching point a4 is to be added to the fourth line of the robot program A, the teaching position of the teaching point b2 can be reused by the following process.

<1> Move a cursor to the fourth line of the robot program A

<2> Press a "Point" button, which is an instruction to add the teaching point a4

<3> Select "3: Search from current positions" from a pop-up teaching point addition method menu. Due to this, the teaching point display control unit 6 displays the teaching points as pop-up around the current position P of the robot 2 on the creation screen 12.

Figure 6:
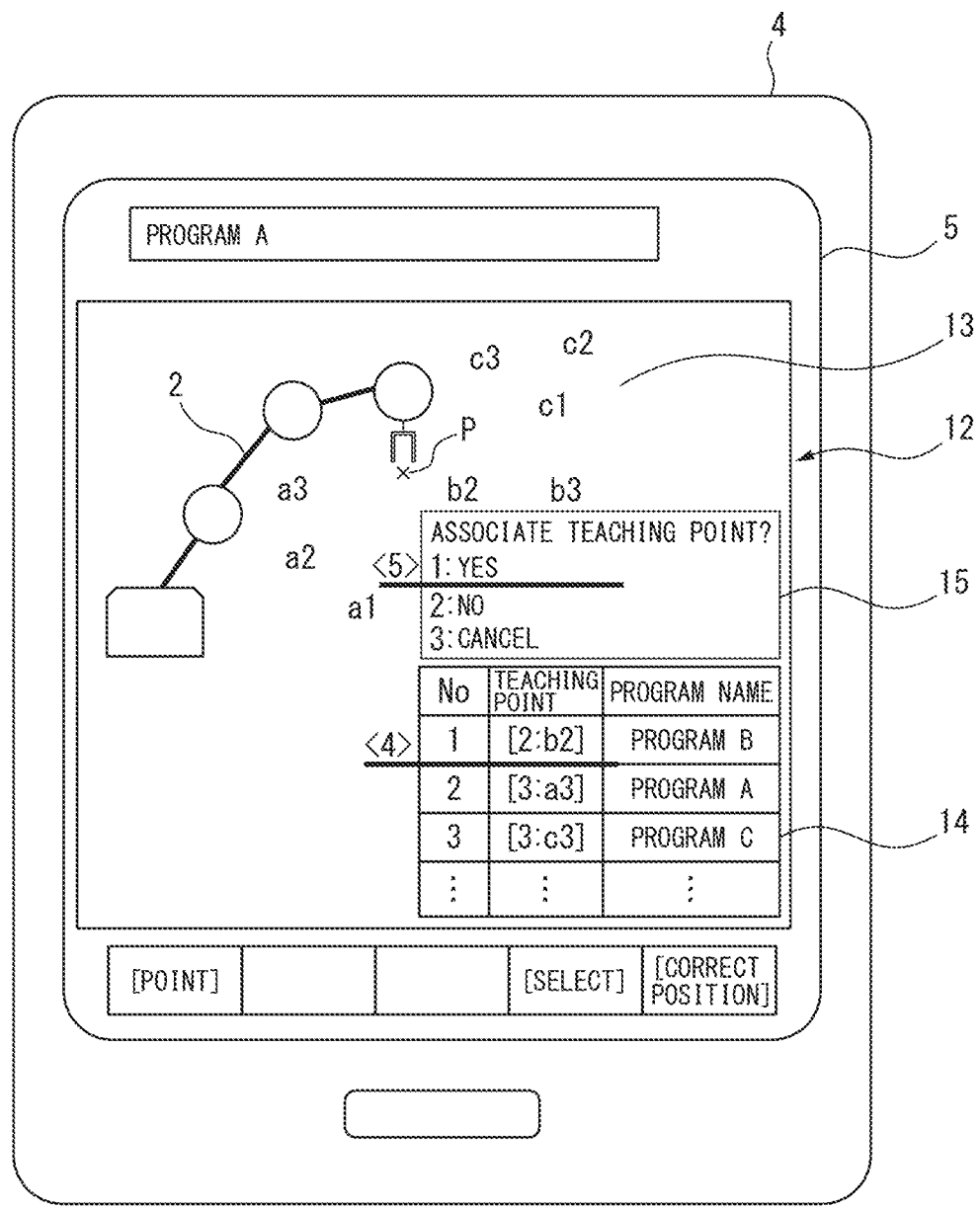
FIG. 6 is a graphic diagram of a teaching point display screen of an embodiment.

FIG. 6 is a graphic diagram of the teaching point display screen of an embodiment. The teaching point display control unit 6 may display all the teaching points around the current position P as pop-up on the creation screen 12. In this regard, since there may be a large number of teaching points and the display processing may be delayed, it is preferable to search teaching points near the current position P of the robot 2, and display only the teaching points a1 to a3, b1 to b3, and c1 to c3 near the current position P on the generation screen 12. Further, the teaching point display control unit 6 may not display the teaching points around the current position P of the robot 2, but may display the teaching points around a teaching point selected by the user, and/or the teaching points around a position desired by the user, on the generation screen 12. In other words, the teaching point display control unit 6 searches the previously taught teaching point near a specific position such as the current position P, the teaching point selected by the user, or the position desired by the user, and displays the searched teaching point on the generation screen 12. In addition, the term "near" herein means within a predetermined distance from a specific position.

Subsequently, the following procedure is performed, and the teaching position of the teaching point b2 is reused.

<4> Select the teaching point b2 from the displayed teaching point graphic diagram 13 as pop-up and/or from a diagram such as a displayed teaching point menu 14, etc., as pop-up. This selection function is implemented by the teaching point selection unit 7. The teaching point selection unit 7 provides a manual selection function in which the user manually selects the teaching point b2, but when the near teaching point is searched, the computer may provide an automatic selection function in which the computer automatically selects the closest teaching point b2.

When the teaching point b2 is selected, the teaching point reuse unit 8 reuses the selected teaching point b2 of the robot program B as a new teaching point a4 of the robot program A. Specifically, the teaching point reuse unit 8 copies the teaching position of the selected teaching point b2 to the teaching position of the new teaching point a4. In this case, although the teaching positions of the teaching point a4 and the teaching point b2 are the same, they are stored in a memory (not shown) as different teaching points. Alternatively, the taught point reuse unit 8 may use the selected taught point b2 as it is as a new teaching point. In this case, the number of teaching points is reduced and the robot program becomes easier to read, whereby the efficiency of teaching operation can be further improved.

In case that the teaching point b2 is reused for the teaching point a4 as another point, when the teaching position of the teaching point b2 or the teaching point a4 is corrected, it is necessary to reflect the correction also on the other teaching points which were originally the same teaching position. Therefore, it is preferable to associate the teaching point a4 with the teaching point b2 by performing the following procedure.

<5> Select "1: Yes" from the displayed teaching point association necessity menu 15 as pop-up. Due to this, the teaching point association unit 9 associates the teaching point a4 and the teaching point b2. For example, the teaching point a4 and the teaching point b2 may be associated and stored in a memory (not shown).

Figure 7:
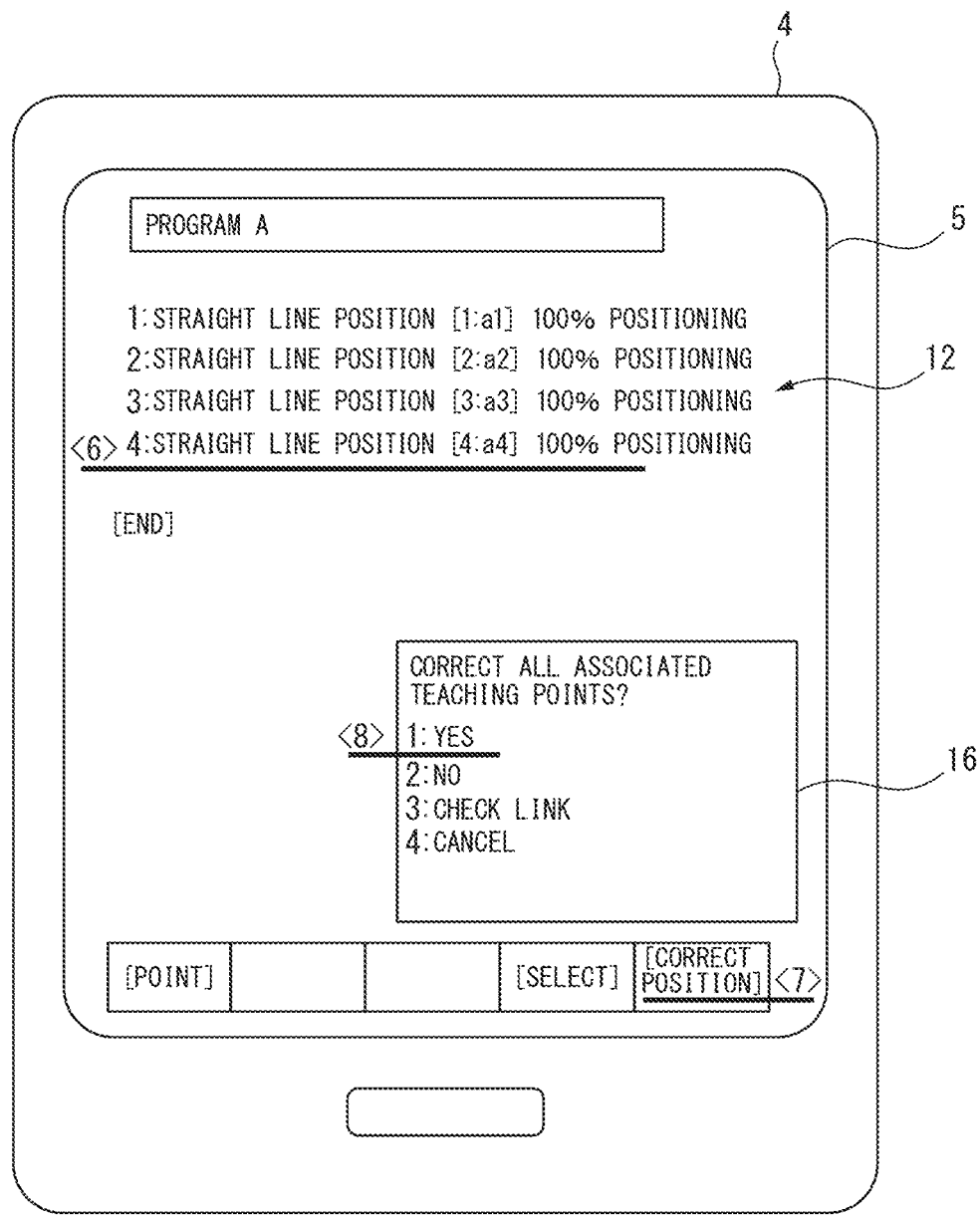
FIG. 7 is a graphic diagram of a robot program generation screen of an embodiment.

Thereafter, when the teaching position of the teaching point a4 is corrected, the following procedure is performed to reflect the correction also on the teaching position of the associated teaching point b2. FIG. 7 is a graphic diagram of the robot program generation screen 12.

<6> Move a cursor to the fourth line of the robot program A, in order to correct the teaching point a4.

<7> Press a "Correct Position" button to correct the teaching position of teaching point a4.

<8> Select "1: Yes" from the displayed relevant teaching point correction necessity menu 16 as pop-up. Due to this, the relevant teaching point correction unit 10 reflects the correction of the teaching position of the teaching point a4 also on the teaching position of the teaching point b2. Conversely, when the teaching position of the teaching point b2 is corrected, the relevant teaching point correction unit 10 reflects the correction of the teaching position of the teaching point b2 also on the teaching position of the teaching point a4. Further, when there are three or more associated teaching points and any one of the teaching point is corrected, the relevant teaching point correction unit 10 reflects the correction also on the teaching positions of all the remaining teaching points. Due to this, it is possible to prevent forgetting to correct the teaching point of the same teaching position, whereby preventing malfunction of the robot.

Figure 8:
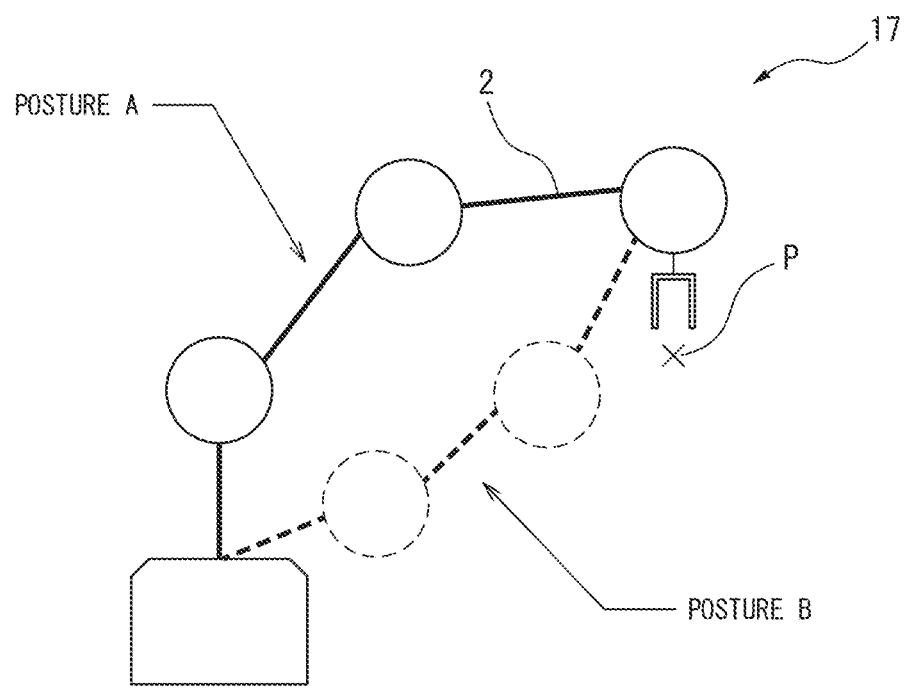
FIG. 8 is a graphic diagram of a teaching posture correction screen of an embodiment.

Also, when the teaching position of the teaching point is corrected, the teaching posture at the teaching point and the teaching posture at the teaching point associated with the teaching point may be corrected together. FIG. 8 is a graphic diagram of a teaching posture correction screen of an embodiment. Even if the teaching position P of the robot 2 is the same, there is a possibility that the posture of the robot when reaching the teaching position may be different, such as a posture A or a posture B. If the posture of the robot 2 is not properly taught, the robot 2 may perform unnecessary movements and the robot body may collide with an obstacle. Therefore, the relevant teaching point correction unit 10 may have a function for collectively correcting the teaching posture at the teaching point and the teaching posture at the teaching point associated with the teaching point, when the teaching position P of the teaching point is corrected. In addition, when the teaching posture of the teaching point is corrected, as well as when the teaching position P is corrected, the relevant teaching point correction unit 10 may reflect the correction also on the teaching posture at the teaching point associated with the teaching point. Due to this, it is possible to prevent forgetting to correct the teaching point of the same teaching posture, whereby preventing malfunction of the robot.

According to the above embodiments, the efficiency of the teaching operation for the robot can be improved. Note that the above operation of the teaching device 4 or the teaching system 11 is an example, and other operations may be added. For example, the teaching point reuse unit 8 may copy the teaching posture the teaching point b2 selected by the teaching point selection unit 8 to the teaching posture at the new teaching point a4.

The programs executed by the processor and/or the integrated circuit described above may be recorded and provided on a computer-readable non-transitory recording medium such as a CD-ROM, or may be distributed and provided wired or wirelessly from a server device on a WAN (wide area network) or LAN (local area network).

Although the various embodiments are described herein, it should be noted that the present invention is not limited to the above embodiments, and various modifications can be performed within the scope of the claims.

REFERENCE SIGNS LIST 1 robot system
2 robot
3 robot controller
4 teaching device
5 user interface unit (UI unit)
6 teaching point display control unit
7 teaching point selection unit
8 teaching point reuse unit
9 teaching point association unit
10 relevant teaching point correction unit
11 teaching system
12 robot program generation screen
13 teaching point graphic diagram
14 teaching point menu
15 teaching point association necessity menu
16 relevant teaching point correction necessity menu
17 teaching posture correction screen
a1 to a4, b1 to b3, c1 to c3 teaching point
P current position (teaching position)

The invention claimed is:

1. A teaching device, comprising:
a user interface unit configured to display a generation screen for a robot program;
a teaching point display control unit configured to control displaying of previously taught teaching points on the generation screen;
a teaching point selection unit configured to select a specific teaching point from the displayed teaching points; and
a teaching point reuse unit configured to reuse the selected teaching point as a new teaching point for a robot program being generated, wherein
a previously taught teaching point of the previously taught teaching points includes a teaching point previously taught for another robot program different from the robot program.

2. The teaching device according to claim 1, wherein the teaching point display control unit configured to
search the previously taught teaching point near a specified position, and
display the searched teaching point.

3. The teaching device according to claim 1, further comprising:
a teaching point association unit configured to associate the previously taught teaching point with the new teaching point.

4. The teaching device according to claim 3, further comprising:
a relevant teaching point correction unit configured to, in response to a teaching position of the teaching point being corrected, reflect the correction on a teaching position of a remaining teaching point associated with the teaching point.

5. The teaching device according to claim 4, wherein
the relevant teaching point correction unit is configured to, in response to the teaching position of the teaching point being corrected, collectively correct a teaching posture at the teaching point and a teaching posture of the remaining teaching point associated with the teaching point.

6. The teaching device according to claim 1, wherein
the teaching point reuse unit is configured to duplicate at least one of the teaching position of the selected teaching point or the teaching posture of the selected teaching point to that of the new teaching point.

7. The teaching device according to claim 1, wherein the teaching point reuse unit is configured to use the selected teaching position as the new teaching point.

8. A teaching system, comprising:
a teaching device configured to display a generation screen for a robot program; and
a robot controller configured to:
control displaying of previously taught teaching points on the generation screen;
select a specific teaching point from the displayed teaching points; and
reuse the selected teaching point as a new teaching point for a robot program being generated, wherein
a previously taught teaching point of the previously taught teaching points includes a teaching point previously taught for another robot program different from the robot program.

9. A non-transitory computer readable medium storing a teaching program for causing a computer to execute:
controlling displaying of previously taught teaching points on a generation screen;
selecting a specific teaching point from the displayed teaching points; and
reusing the selected teaching point as a new teaching point for a robot program being generated, wherein
a previously taught teaching point of the previously taught teaching points includes a teaching point previously taught for another robot program different from the robot program.

* * * * *